United States Patent
Lüdke et al.

[11] Patent Number: 5,896,958
[45] Date of Patent: Apr. 27, 1999

[54] DRUM BRAKE WITH DIVIDED BRAKE SUPPORT PLATE

[75] Inventors: Peter Lüdke, Remagen; Frank Biebricher, Fachingen; Albert Langert, Neuwied; Eckhart Op den Camp, Koblenz, all of Germany

[73] Assignee: Lucas Industries public limited company, West Midlands, United Kingdom

[21] Appl. No.: 08/757,432

[22] Filed: Nov. 27, 1996

Related U.S. Application Data

[63] Continuation of application No. PCT/EP95/02731, Jul. 12, 1995.

[30] Foreign Application Priority Data

Jul. 28, 1994 [DE] Germany .......................... 94 12 234 U

[51] Int. Cl.⁶ .................................................. F16D 65/14
[52] U.S. Cl. .................................... 188/206 A; 188/205 A
[58] Field of Search .................................... 188/18 A, 78, 188/206 A, 206 R, 331, 341, 205 A

[56] References Cited

U.S. PATENT DOCUMENTS

| | | | |
|---|---|---|---|
| 2,181,029 | 11/1939 | Thomas | 188/79.5 |
| 3,385,405 | 5/1968 | Cullen | 188/206 A |
| 3,682,277 | 8/1972 | Brown | 188/205 A |
| 4,061,429 | 12/1977 | Mathues | |
| 5,518,088 | 5/1996 | Brosilow | 188/205 A |

FOREIGN PATENT DOCUMENTS

| | | |
|---|---|---|
| 0485093 | 5/1992 | European Pat. Off. |
| 3705008 | 8/1987 | Germany |
| 3703395 | 8/1988 | Germany |
| 5929828 | 2/1984 | Japan ................... 188/205 A |

*Primary Examiner*—Matthew C. Graham
*Assistant Examiner*—C. T. Bartz
*Attorney, Agent, or Firm*—Wood, Herron & Evans L.L.P.

[57] ABSTRACT

The drum brake has a brake support plate which is divided into a supporting body (10) and a back plate (22). The supporting body (10) has a central ring (12) for centering and securing to an axle housing of a vehicle, and an abutment carrier (16) against which brake shoes (38) can bear in a circumferential direction. The brake shoes (38) can bear against the back plate (22) in an axial direction. At the supporting body (10) a mounting means (20) for a wheel speed sensor (46) and a rest (56) for a jacket (58) of a brake cable (60) are additionally formed.

12 Claims, 5 Drawing Sheets

DRUM BRAKE WITH DIVIDED BRAKE SUPPORT PLATE

This application is a continuation of international application PCT/EP95/02731, filed Jul. 12, 1995, currently pending.

This invention relates to a drum brake as defined in the preamble clause of claim 1.

With drum brakes of this type, there is a distinct task sharing between the supporting body on the one hand, and the back plate, on the other hand. The task of the supporting body is to transmit the circumferential forces occurring during braking from the brake shoes to the associated axle housing, and for that purpose it is sturdily built. Nevertheless, the supporting body can be manufactured as a relatively light-weight component because, with the exception of its central ring, it has to extend over only a short sector of the drum brake. The task of the back plate, however, is to support the brake shoes in the axial direction only; besides, the back plate acts as a dirt shield to protect the interior space of the drum brake against contamination. The back plate must therefore extend essentially over the entire circumference of the drum brake; nevertheless, the back plate also permits a certain weight saving if it is only moderately loaded, and can therefore be made from material with a comparatively small thickness. The total weight of supporting body and back plate of drum brakes of this type is therefore smaller than that of drum brakes with the widely generally employed integral anchor plate, which serves both purposes and is therefore manufactured as a moulded part from thick steel plate.

Vehicles equipped with an antiblock system (ABS) and probably additionally with an antislip control system (ASC) are provided with wheel speed sensors which, for example, can be arranged at one drum brake each. In this case it is common practice to provide dirt shields or back plates of the described type with a mounting device for such a sensor. For example, a welded on tube can be provided as such a mounting device.

With such known arrangements problems occur due to the fact that when driving over rough roads, vibrations can be induced in the anchor plates normally moulded from steel plate. These anchor plates can also have internal stresses which are released due to the heat generated upon heavy or long braking and result in a permanent deformation. Although vibrations and/or permanent deformation have no significance for the proper function of the anchor plate, they can, however, result in periodic or continuous position variations of a mounting device for a wheel speed sensor formed on it. This results in a failure to exactly maintain a predetermined air gap between the sensor and a marking to be sensed by it, which again may result in problems in the determination of speed changes of the associated wheel.

The invention is therefore based on the object to develop a drum brake in such a manner that it is suited for an arrangement of a wheel speed sensor which, even under considerable heating does not vary substantially.

According to the invention, this object is solved by the characteristics of claim 1.

The supporting body according to the invention shows an only insignificant variation in shape even under considerable heating, because other as the associated back plate and also contrary to the known anchor plates, it only extends over a small portion of the area occupied by the drum brake, so that the supporting body is not liable to build up internal stresses which could be released upon heating. The back plate, however, can undergo considerable deformation without influencing the position of the mounting device for the wheel speed sensor, which according to the invention is arranged at the supporting body.

Advantageous embodiments of the invention are apparent from the subclaims.

In the following, embodiments of the invention will be explained in detail with reference to the schematic drawings, in which.

Figure 1:
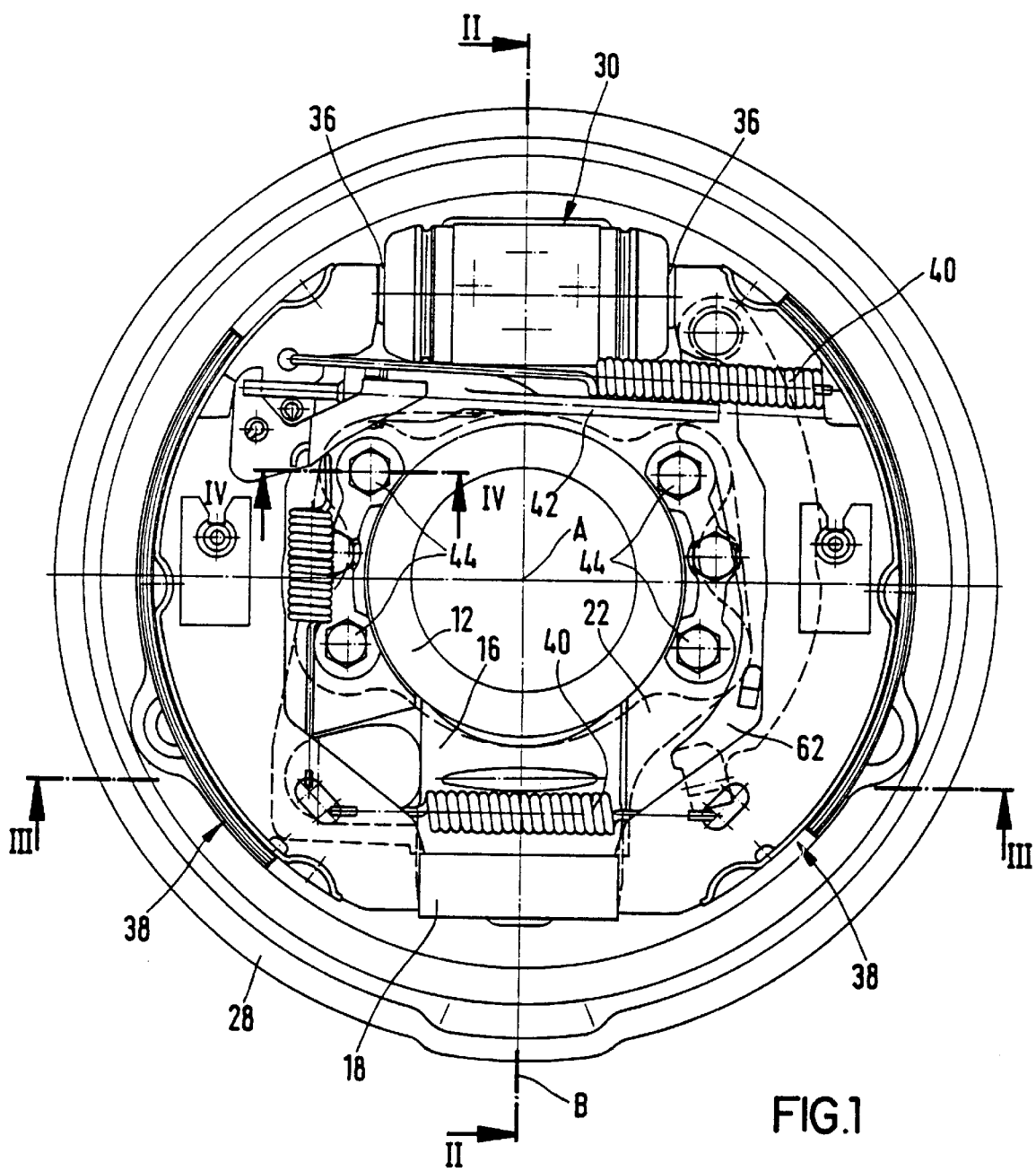
FIG. 1 is a side view of a first drum brake according to the invention.
Figure 2:
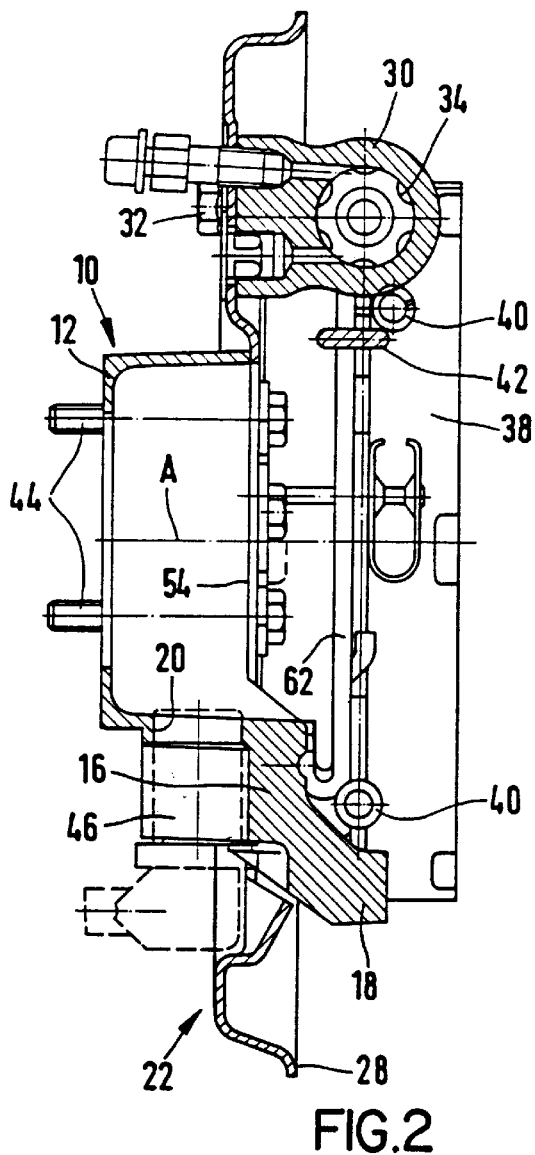
FIG. 2 is a section in the axial plane II—II of FIG. 1.
Figure 3:
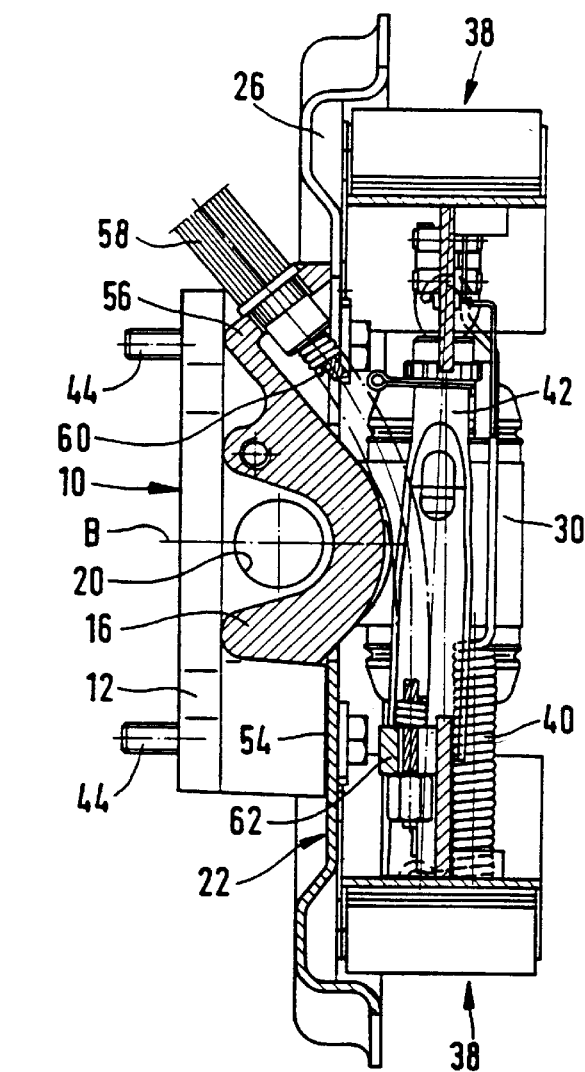
FIG. 3 is a section in the axially parallel plane III—III of FIG. 1.
Figure 4:
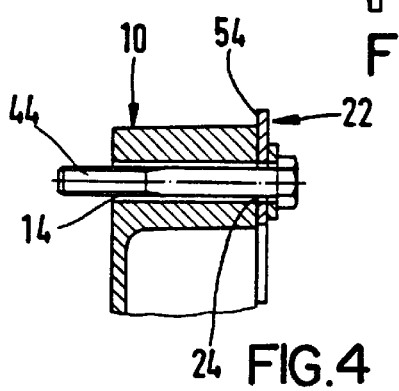
FIG. 4 is a section in another axially parallel plane IV—IV of FIG. 1.

Each of the two drum brakes shown comprises as a structural component a supporting body 10, which in a paste-like condition is moulded under high pressure from a high-strength aluminium alloy. The supporting body 10 has a central ring 12, the radially inner edge of which has been finish-machined by turning. In the ring 12 four spaced angularly offset holes 14 are formed. The supporting body 10 further comprises an abutment carrier 16 which extends in a radially outward direction from the ring 12 and, relative to the vehicle, in an inclined inward direction and carries at its end an abutment 18, which can either be integrally formed with it or formed by a steel plate or the like, rivet connected in a conventional manner. In the embodiment shown in FIGS. 1 through 4, the supporting body as a whole is symmetric with respect to a centre plane B including axis A of the circular inner contour of the ring 12.

In a radial relationship to the axis A (FIGS. 1 through 4) or in an inclined relationship to it (FIGS. 5 through 7) and also included in the centre plane B, a hole is arranged which is machined at the shoulder of the abutment carrier 16 into the ring 12 and which serves as a mounting means 20 for a wheel speed sensor. Due to the close vicinity of the mounting means 20 with the radial inner edge of the ring 12 being accurately positioned in an axial and radial direction, said mounting means 20 is hardly affected by thermal expansion; moreover, the cantilevered abutment carrier 16 is subjected to the air stream and thus cooled appropriately. Even the maximum mechanical loads occurring during operation cannot vary the position of the mounting means 20 of the design shown to such an extent which would impair the signal output of the sensor.

The two drum brakes shown also include one each essentially annular back plate 22 which in the embodiments shown is punched from thin steel or aluminium sheet, but can also be a plastic moulding. The back plate 22 has four holes 24 which are aligned with one each of the holes 14 of the supporting body 10, as well as projections 26 and a circumferential raised rim 28. At the back plate 22, diametrically opposed to the abutment 18, a brake cylinder 30 is secured by means of screws 32.

The brake cylinder 30 has a full-length cylinder bore 34 in which two pistons 36 are guided. One brake shoe 38 each bears against the two pistons 36 with its upper end (FIGS. 1 and 2), while the bottom ends of both brake shoes 38 bear against the abutment 18. The two brake shoes 38 are interconnected in a conventional manner via return springs 40, and an adjusting strut 42 is arranged between the two brake shoes 38 at a small distance from the brake cylinder 30. As can best be seen from FIGS. 4 and 7, one screw 44 each extends through the aligned holes 14 and 24 for mounting to an axle housing (not shown) at which the ring 12 with its precision machined circular inner surface is centered. The back plate 22 does not require precise centering; it is therefore only centered coarsely by means of the screws 44.

A wheel speed sensor 46 is installed in the mounting means 20 in a precisely specified position. This sensor 46 is allocated a marking 48 arranged around a section of a wheel hub 50 (only shown in FIG. 6) which projects into the ring 12 at a radial distance. The wheel hub 50 is integrally formed with a brake drum 52. The mentioned axle housing (not shown) can be arranged in a conventional manner at a wishbone of a vehicle.

Another common characteristic of the two drum brakes shown is that the area of the back plate 22 which is attached to the supporting body 10 is separated from it by an intermediate layer 54 of a vibration damping material. The intermediate layer 54 can be a coating on the adjacent surfaces of the back plate 22 and/or the supporting body 10 of an elastomeric material known under the trade mark Wolverine. The intermediate layer 54 largely prevents vibrations induced in the thin back plate 22 from being transmitted to the supporting body 10 and thus on the mounting means 20 for the wheel speed sensor 46. An intermediate layer 54 in the form of a Wolverine coating has proven to be particularly effective against vibrations in the range of 3000 Hz.

For the mechanical actuation of drum brakes, in particular parking braking a Bowden cable is usually provided with a brake cable acting on a lever which bears against one of the brake shoes. The brake cable is normally routed through a hole in the back plate, and the jacket is supported in the vicinity of the hole for transmitting reaction forces to the back plate. Because of these reaction forces, the anchor plate must normally be built relatively strong and thus heavy although the reaction forces occurring during braking and acting in a circumferential direction of the brake shoes are absorbed by the supporting body.

Figure 5:
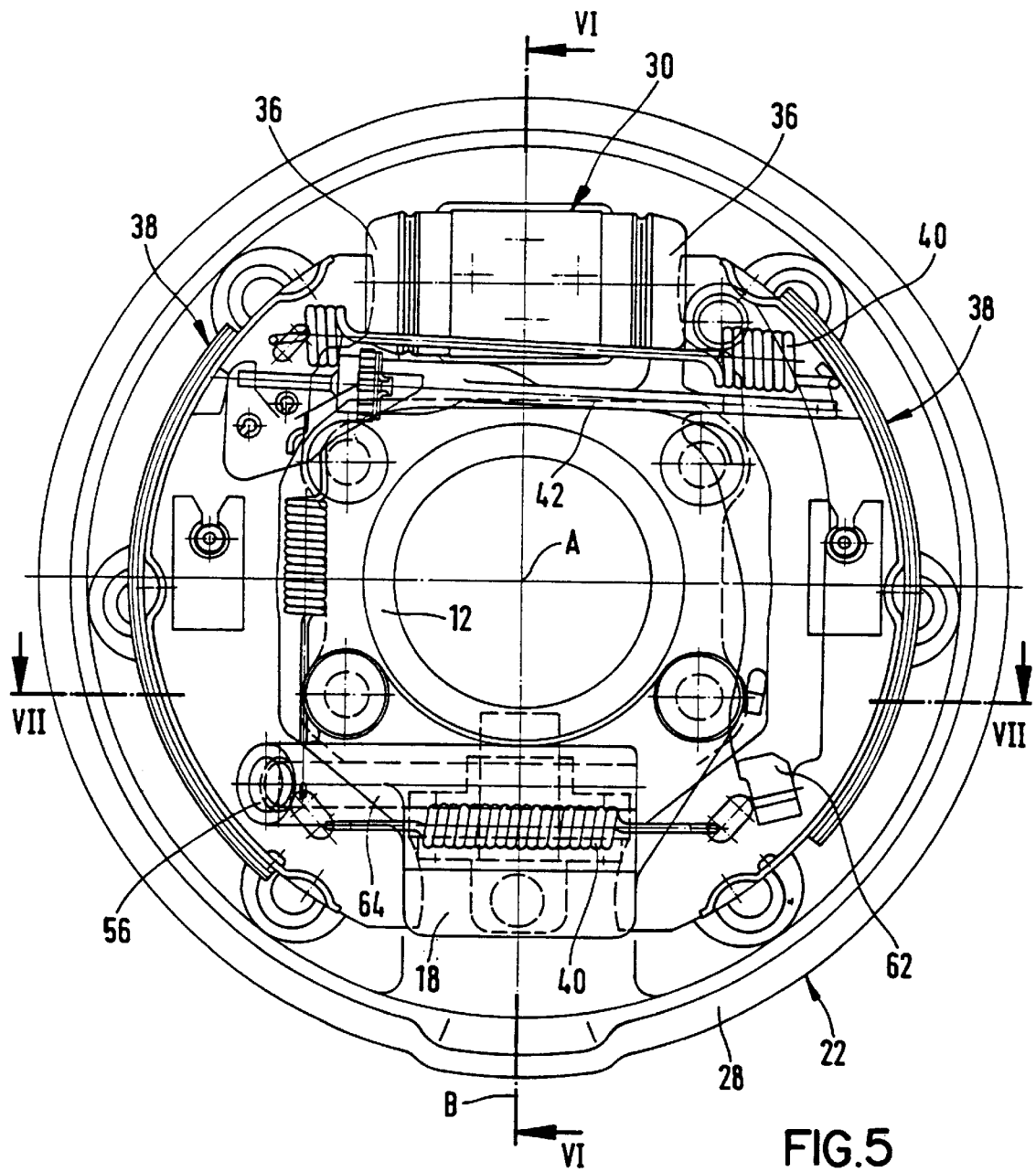
FIG. 5 is a side view corresponding to FIG. 1 of a second drum brake according to the invention.
Figure 6:
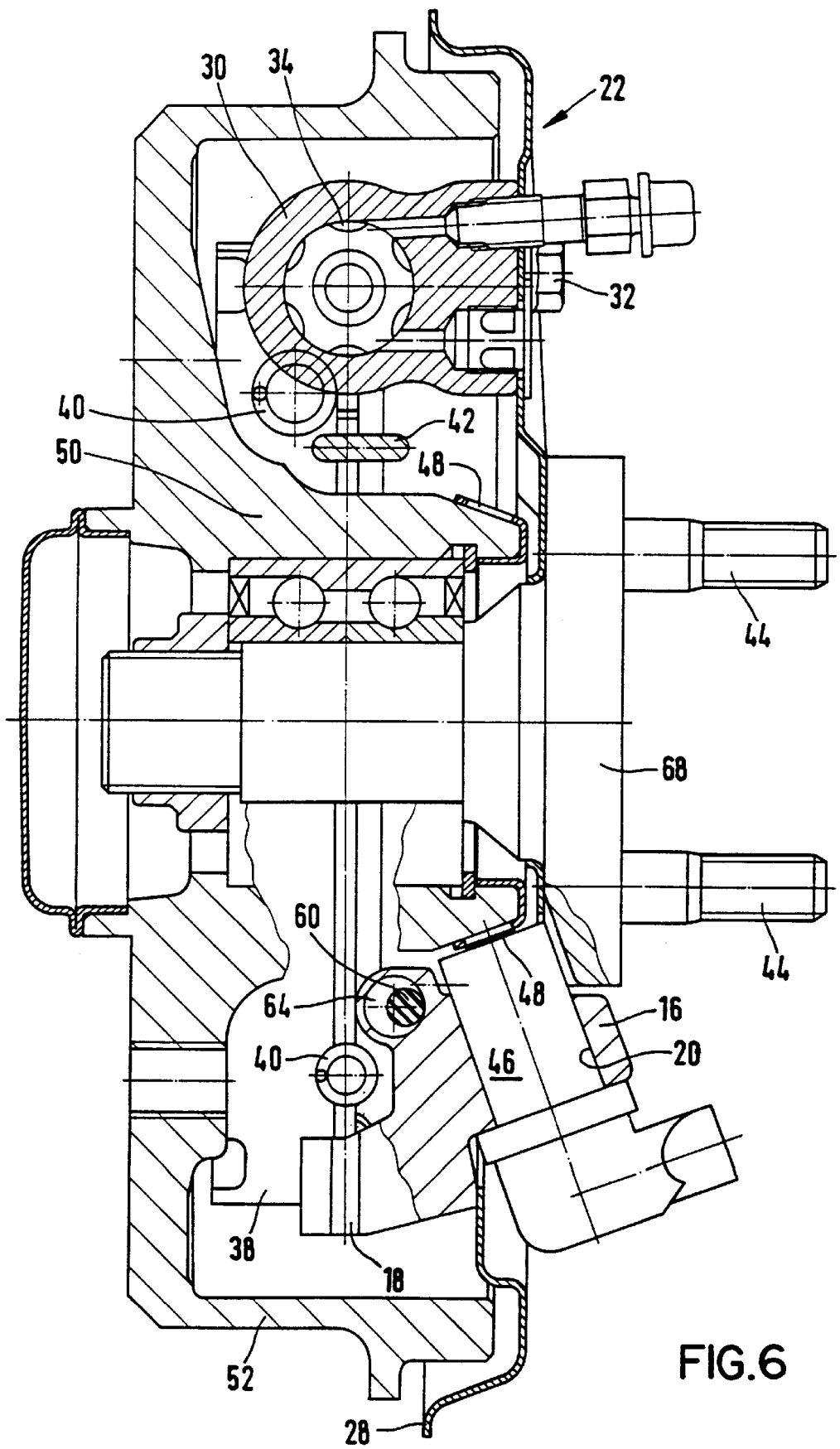
FIG. 6 is a section in the axial plane VI—VI of FIG. 5.
Figure 7:
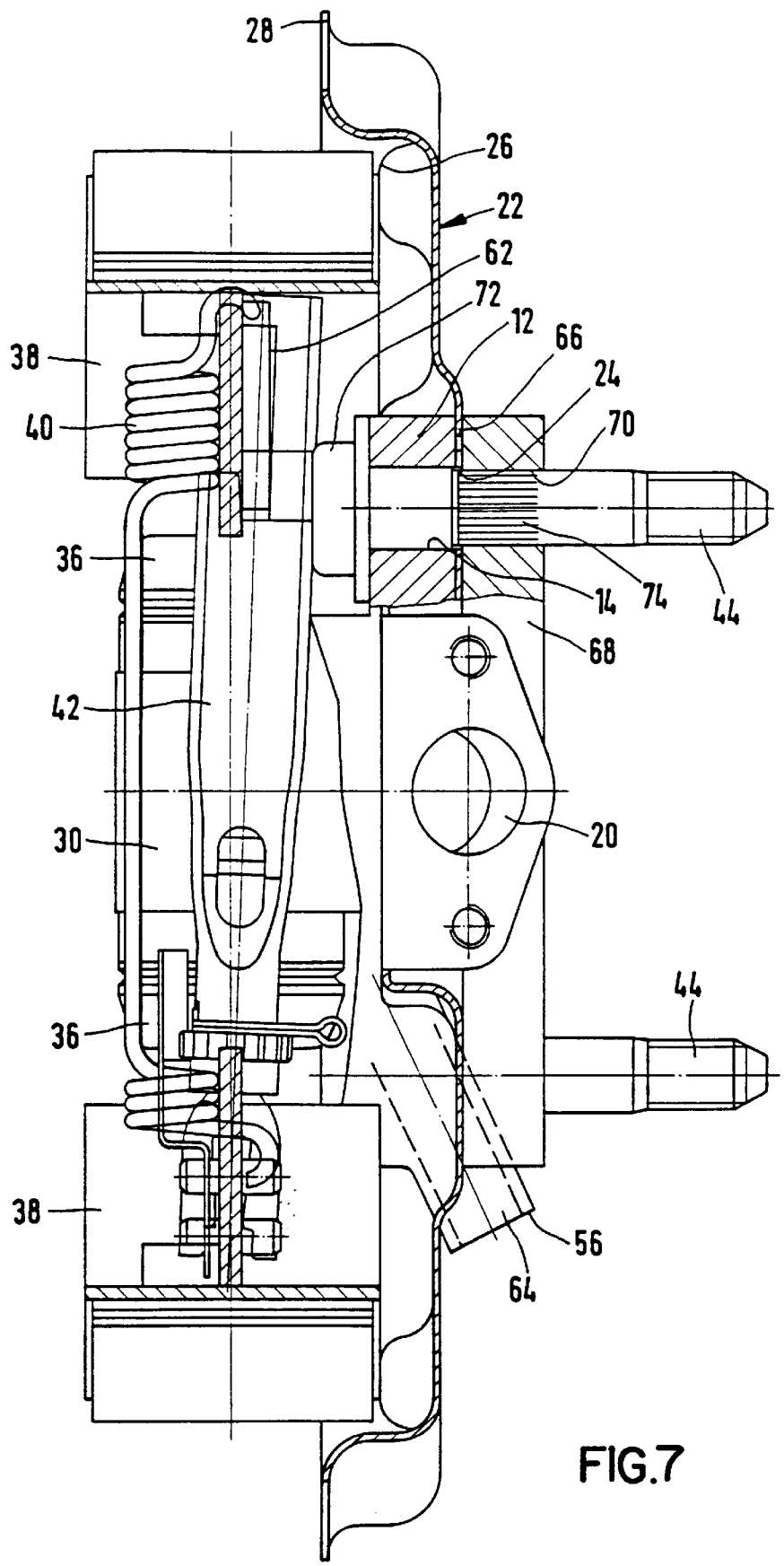
FIG. 7 is a section in the axially parallel plane VII—VII of FIG. 5.

In contrast to this, the back plate 22 of the two embodiments according to the invention is also relieved from the reaction forces of the brake actuation forces. This is achieved in that the supporting body 10 is provided with a rest 56 for the jacket 58 associated with the conventional Bowden cable. The associated brake cable 60 is hooked in the usual manner near the end of a brake lever 62 which is pivotably supported at one of the brake shoes 38 and cooperates with the adjusting strut 42. As shown in FIGS. 5 through 7, this design principle is further developed in that the rest 56 is formed at the beginning of a channel 64 running straight or arc shaped through the supporting body 10, and with its end section being so aligned with the end of the brake lever 62 that the brake cable 60 automatically engages the brake lever 62 during assembly.

The embodiment according to FIGS. 5 through 7 as compared to that of FIGS. 1 through 4 is further characterized in that the radial inner run of the back plate 22 into which the holes 24 are formed is clamped between the supporting body 10 and an annular clamping plate 68. For this purpose, the screws 44 extend, as in the embodiment illustrated in FIGS. 1–4, through one hole 14 each in the supporting body 10 as well as one hole 24 in the back plate 22 and further through one hole 70 each in the clamping plate 68. The screws 44 have a straight knurling 74 at a distance from their head 72, by means of which they penetrate the wall of the associated hole 70 in such a manner that the clamping plate 68 with the back plate 22 and the supporting body 10 are already captivated before the screws 44 as mentioned above are inserted into an axle housing (not shown) or the like of a motor vehicle.

We claim:

1. In combination, the invention comprising:
a drum brake having a compound support plate, the support plate including,
a) a supporting body (10) with a central ring (12) for centering and securing to an axle housing of a vehicle with an abutment carrier (16) adapted to support brake shoes (38) in a circumferential direction, the supporting body (10) including a hole (20) formed therein at a shoulder of the abutment carrier (16), the hole (20) located adjacent a radial inner edge of the ring (12), and
b) a back plate (22) with which the brake shoes (38) are in engagement so as to be prevented from moving in an axial direction; and
a wheel speed sensor (46) located within the hole (20).

2. The invention according to claim 1, characterized in that the abutment carrier (16) and the hole (20) reside in a common axial centre plane (B) which extends axially along an axis (A) of the drum brake.

3. The invention according to claim 2, characterized in that the supporting body (10) as a whole is designed to be symmetrical relative to the centre plane (B).

4. The invention according to claim 2, characterized in that the hole (20) is oriented with respect to the axis (A) so as to extend radially therefrom.

5. The invention according claim 1 characterized in that an abutment (18) for brake shoes 38 is integrally formed at the abutment carrier (16).

6. The invention according to claim 1 characterized in that the supporting body (10) is made from aluminium by a pressure die casting method.

7. The invention according to claim 1 characterized in that a vibration damping intermediate layer (54), of a plastic material is arranged between the supporting body (10) and the back plate (22).

8. The invention according to any of claims 1 characterized in that the supporting body (10) also comprises a rest (56) for a jacket (58) of a brake cable (60) for the mechanical actuation of the brake.

9. The invention according to claim 8, characterized in that a channel (64) is connected to the rest (56), through which the brake cable (60) is routed to a brake lever (62).

10. The invention according to claim 1 characterized in that the back plate (22) comprises a radial inner rim (66) which is clamped between the supporting body (10) and a clamping plate (68).

11. The invention of claim 4 wherein the hole (20) extends radially from the axis (A) in a plane transverse to the axis (A).

12. The invention of claim 4 wherein the hole (20) extends radially from the axis (A) in a plane which resides at an acute angle with respect to the axis (A).

* * * * *